(12) United States Patent
Pogulievsky

(10) Patent No.: US 12,155,689 B2
(45) Date of Patent: *Nov. 26, 2024

(54) SYSTEM AND METHOD FOR AUTOMATIC FORENSIC INVESTIGATION

(71) Applicant: COGNYTE TECHNOLOGIES ISRAEL LTD., Herzliya Pituach (IL)

(72) Inventor: Vadim Pogulievsky, Herzliya Pituach (IL)

(73) Assignee: COGNYTE TECHNOLOGIES ISRAEL LTD. (IL)

( * ) Notice: Subject to any disclaimer, the term of this patent is extended or adjusted under 35 U.S.C. 154(b) by 845 days.

This patent is subject to a terminal disclaimer.

(21) Appl. No.: 17/180,799

(22) Filed: Feb. 21, 2021

(65) Prior Publication Data

US 2022/0006832 A1 Jan. 6, 2022

Related U.S. Application Data

(63) Continuation of application No. 15/416,026, filed on Jan. 26, 2017, now Pat. No. 10,931,707.

(30) Foreign Application Priority Data

Jan. 28, 2016 (IL) .......................................... 243825

(51) Int. Cl.
    *H04L 9/40* (2022.01)
(52) U.S. Cl.
    CPC ...... *H04L 63/1441* (2013.01); *H04L 63/1408* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,472,422 B1 | 12/2008 | Agbabian | ............... H04L 41/06 |
| | | | 726/25 |
| 8,402,543 B1 | 3/2013 | Ranjan et al. | |
| 8,682,812 B1 | 3/2014 | Ranjan | |
| 8,779,921 B1 | 7/2014 | Curtiss | |
| 2003/0097439 A1 | 5/2003 | Strayer et al. | |

(Continued)

OTHER PUBLICATIONS

Bilge, Leyla, et al., "EXPOSURE: Finding Malicious Domains Using Passive DNS Analysis," 2014, 17 pages.
Dietrich, C.J., et al., "CoCoSport: Clustering and recognizing botnet command and control channels using traffic analysis," Computer Networks, vol. 57, 2013, pp. 475-486.

(Continued)

*Primary Examiner* — Christopher C Harris
(74) *Attorney, Agent, or Firm* — ISUS INTELLECTUAL PROPERTY PLLC; Anthony Jason Mirabito

(57) ABSTRACT

Automatic forensic investigation techniques to more effectively differentiate false positives from true positives. An incident is automatically investigated by a processor that communicates instructions to a device on a network and analyzes information received from the device in response to the instructions. In response to analyzing, the processor raises or lowers its level of confidence in the incident. If the processor's level of confidence in the incident is sufficiently high, the processor generates an output that indicates that the security of the network has been compromised. Otherwise, the processor ascertains that the incident is a false positive and may modify a criteria for alert generation.

18 Claims, 2 Drawing Sheets

(56) References Cited

U.S. PATENT DOCUMENTS

| | | | |
|---|---|---|---|
| 2005/0044406 A1 | 2/2005 | Stute | C12Q 1/6804 726/4 |
| 2008/0005782 A1 | 1/2008 | Aziz | G06F 9/45537 726/3 |
| 2008/0016569 A1* | 1/2008 | Hammer | G06F 21/554 726/23 |
| 2008/0028463 A1 | 1/2008 | Dagon et al. | |
| 2008/0141376 A1 | 6/2008 | Clausen et al. | |
| 2010/0071065 A1 | 3/2010 | Khan et al. | |
| 2011/0099620 A1 | 4/2011 | Stavrou et al. | |
| 2012/0167221 A1 | 6/2012 | Kang et al. | |
| 2013/0055399 A1 | 2/2013 | Zaitsev | H04L 63/0263 726/25 |
| 2013/0074143 A1 | 3/2013 | Bu | H04L 63/1416 726/1 |
| 2013/0097699 A1 | 4/2013 | Balupari | G06F 21/552 726/22 |
| 2015/0135326 A1 | 5/2015 | Bailey, Jr. | |
| 2015/0172302 A1 | 6/2015 | Conlon | H04L 63/1408 726/23 |
| 2016/0019388 A1 | 1/2016 | Singla | G06F 21/552 726/23 |
| 2016/0359825 A1 | 12/2016 | Chand | G05B 19/048 |
| 2017/0142144 A1 | 5/2017 | Weinberger | H04L 63/0263 |
| 2017/0279834 A1 | 9/2017 | Vasseur | H04L 63/1425 |

OTHER PUBLICATIONS

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.

Gu, G., et al., "BotSniffer: Detecting Botnet Command and Control Channels in Network Traffic," Proceedings of the 15$^{th}$ Annual Network and Distributed System Security Symposium (NDSS'08), San Diego, California, 2008, 18 pages.

Jacob, G., et al., "JACKSTRAWS: Picking Command and Control Connections from Bot Traffic," Proceedings of the 20$^{th}$ Usenix Security Symposium, San Francisco, 2011, 16 pages.

Livadas, C., et al., "Using Machine Learning Techniques to Identify Botnet Traffic," In 2$^{nd}$ IEEE LCN Workshop on Network Security (WoNS'2006), 2006, pp. 967-974.

Rieck, K., et al., "Botzilla: Detecting the 'Phoning Home' of Malicious Software," Proceedings of the ACM Symposium on Applied Computing (SAC), Sierre, Switzerland, 2010, 7 pages.

Wang, H., et al., "NetSpy: Automatic Generation of Spyware Signatures for NIDS," Proceedings of the 22$^{nd}$ Annual Computer Security Applications Conference, Miami Beach, Florida, Dec. 2006, ten pages.

* cited by examiner

SYSTEM AND METHOD FOR AUTOMATIC FORENSIC INVESTIGATION

FIELD OF THE DISCLOSURE

The present disclosure relates to security monitoring of a computer network.

BACKGROUND OF THE DISCLOSURE

An organization needs to be constantly vigilant in monitoring the security of its computer network. Threats to computer networks include cyberattacks, malware, and exploits.

SUMMARY OF THE DISCLOSURE

There is provided, in accordance with some embodiments of the present invention, apparatus for monitoring security of a computer network. The apparatus includes a network interface and a processor. The processor is configured to, via the network interface, receive, from one or more of a plurality of sensors associated with the computer network, one or more alerts indicative of a possible compromise to the security of the computer network. The processor is further configured to automatically investigate the alerts, by (i) communicating instructions to at least one entity on the computer network, and (ii) analyzing information received in response to the instructions. The processor is further configured to, in response to investigating the alerts, generate an output.

In some embodiments, the processor is configured to, by investigating the alerts, compute a level of confidence in the alerts, and to generate the output only if the level of confidence exceeds a given threshold.

In some embodiments, the apparatus further includes the plurality of sensors.

In some embodiments, the at least one entity includes one of the plurality of sensors.

In some embodiments, the instructions include instructions to an endpoint forensic sensor to scan an endpoint device on the computer network.

In some embodiments, the instructions include instructions to a file analysis sensor to scan a file.

In some embodiments, the at least one entity includes one of the plurality of sensors that did not generate any of the received alerts.

In some embodiments, the information includes at least one record of past network traffic over the computer network.

In some embodiments, the information includes at least one record of past activity of at least one endpoint device on the computer network.

In some embodiments, the processor is further configured to, in response to investigating the alerts, modify criteria for alert generation of at least one of the plurality of sensors.

There is further provided, in accordance with some embodiments of the present invention, a method for monitoring security of a computer network. The method includes receiving, from one or more of a plurality of sensors associated with the computer network, one or more alerts indicative of a possible compromise to the security of the computer network. The alerts are automatically investigated, by (i) communicating instructions to at least one entity on the computer network, and (ii) analyzing information received in response to the instructions. In response to investigating the alerts, an output is generated.

There is further provided, in accordance with some embodiments of the present invention, a computer software product including a tangible non-transitory computer-readable medium in which program instructions are stored. The instructions, when read by a processor, cause the processor to receive, from one or more of a plurality of sensors associated with the computer network, one or more alerts indicative of a possible compromise to the security of the computer network. The instructions further cause the processor to automatically investigate the alerts, by (i) communicating instructions to at least one entity on the computer network, and (ii) analyzing information received in response to the instructions. The instructions further cause the processor to, in response to investigating the alerts, generate an output.

The present disclosure will be more fully understood from the following detailed description of embodiments thereof, taken together with the drawings, in which:

DETAILED DESCRIPTION OF EMBODIMENTS

Overview

Figure 1:
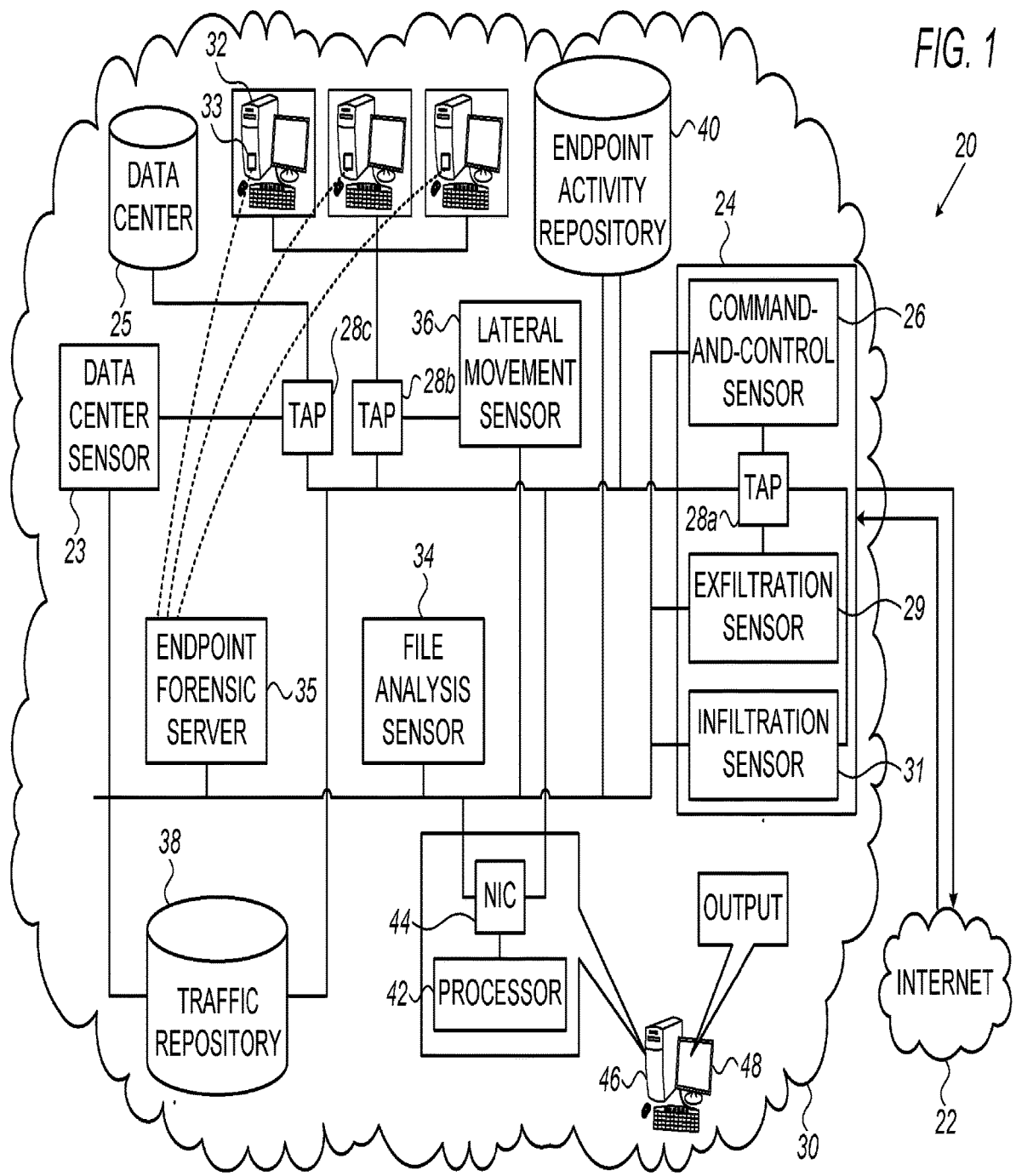
FIG. 1 is a schematic illustration of a system for monitoring security of a computer network, in accordance with some embodiments described herein.

In embodiments described herein, a plurality of sensors are used to monitor a computer network. Each of the sensors is configured to generate an alert, if the sensor detects a possible compromise to the security of the network. A processor receives any alerts that are generated, and decides, based on the alerts, whether an incident should be opened.

A challenge in network security monitoring is that in order for the sensors to detect any possible threats to the computer network, the sensitivity of the sensors needs to be high. With high sensitivity, however, the sensors will generate many false-positive alerts, and hence, the processor will open may false-positive incidents. The processor must therefore be able to differentiate false-positive incidents from true-positive incidents.

One technique for differentiating false positives from true positives (either at the alert level or at the incident level) is to correlate between respective alerts received from different sensors. For example, the processor may ascertain that a given alert is indicative of a particular type of attack only if the processor has also received at least one other alert that historically has accompanied the given alert in cases of such an attack. Although helpful, however, the effectiveness of this technique in filtering out false positives is limited.

Hence, alternatively or additionally to employing the above-described correlation technique, embodiments described herein use automatic forensic investigation techniques to more effectively differentiate false positives from true positives. Upon the opening of an incident, the incident is automatically investigated by a processor. (It may be alternatively stated that the processor investigates the received alerts, since, effectively, the incident is representative of the received alerts.) To investigate the incident, the processor communicates instructions to at least one entity on the computer network, and analyzes information received from the device in response to the instructions. For example, the processor may issue instructions to one of the sensors, and/or another resource on the network such as an information repository, to communicate particular information to the processor. (In other words, the processor may query a sensor or information repository for particular information.) Alternatively or additionally, the processor may instruct a sensor, or other device on the network, to perform a particular task, and communicate the results of the task to the processor.

In response to analyzing the information that is received in response to the instructions, the processor raises or lowers its level of confidence in the incident. If, following the automatic investigation of the incident, the processor's level of confidence in the incident is sufficiently high, the processor generates an output that indicates that the security of the network has been compromised. Otherwise, the processor ascertains that the incident is a false positive.

In some embodiments, in response to ascertaining whether the incident is a true or false positive, the processor modifies the criteria for alert generation of at least one of the sensors that prompted the opening of the incident, and/or at least one of the other sensors. For example, in response to a false positive, the processor may lower the sensitivity of one of the sensors, and/or instruct the sensor not to generate an alert in the future if certain conditions are satisfied. Conversely, the processor may increase the sensitivity of a particular sensor, in response to identifying a true positive.

It is emphasized that the investigative techniques described herein differ fundamentally from methods that rely solely on the above-described correlation technique, at least in that the processor initiates an exchange of communication which, typically, would not have taken place if not for the initiative of the processor. In other words, the processor proactively investigates an alert by retrieving additional information or instructing that certain functions be performed, rather than merely waiting for additional alerts to arrive. Such investigative techniques facilitate a more effective and timely determination of whether an incident is a true or false positive, and further help increase the precision of the sensors.

System Description

Reference is initially made to FIG. 1, which is a schematic illustration of a system 20 for monitoring security of a computer network 30, in accordance with some embodiments described herein. Computer network 30 typically comprises an internal network, such as an intranet belonging to a corporation.

Network traffic is exchanged between network 30 and external networks, such as the Internet 22, via the perimeter 24 of the network, which may include, for example, a firewall and/or a gateway. The traffic passes through a first network tap 28a situated in perimeter 24, which provides a copy of the traffic to relevant monitoring sensors.

For example, FIG. 1 shows a command-and-control sensor 26 monitoring the traffic passing through the perimeter. Command-and-control sensor 26 checks the traffic for possible communication exchanged with malware residing in network 30. For example, sensor 26 may attempt to identify instructions sent to or from malware, and/or data communicated by malware. Upon identifying such communication, sensor 26 generates an alert. The command-and-control sensor may monitor traffic that uses any relevant protocol, including Hypertext Transfer Protocol (HTTP), HTTP Secure (HTTPS), and the Domain Name System (DNS) protocol.

FIG. 1 further shows an exfiltration sensor 29, which monitors data leaving the network. Upon detecting a possible exfiltration of data from the network, exfiltration sensor 29 generates an alert. Exfiltration sensor 29 may monitor any relevant protocol, including, for example, file transfer protocol (FTP), HTTP, and HTTPS. Alternatively or additionally, an infiltration sensor 31, also shown in FIG. 1, may generate an alert upon detecting an apparent entry of an attacker, such as via email (e.g., spear phishing), drive-by-download exploits, or other techniques.

Network 30 comprises a plurality of interconnected devices, including, but not limited to, endpoint devices 32, and a data center 25 (or a plurality of such data centers). Data exchanged with endpoint devices 32 pass through a second network tap 28b, while data exchanged with data center 25 pass through a third network tap 28c. Additional monitoring sensors, which reside on the devices, and/or are connected to tap 28b or 28c, monitor the security of the network.

For example, endpoint forensic agents 33, which reside on devices 32, monitor the processes running on, and the files being used by, devices 32. Information from endpoint forensic agents 33 is passed to an endpoint forensic server 35, which generates alerts in response to the information. Endpoint forensic server 35 together with endpoint forensic agents 33 may be collectively referred to as an endpoint forensic sensor.

Typically, a file analysis sensor 34 analyzes files that were received from the network taps or from any of the other sensors, in order to detect any potentially malicious files. In some embodiments, file analysis sensor 34 effectively comprises two logical components: a static sensor scans files for potentially malicious content, while a dynamic sensor runs executable files to determine whether the files are malicious.

Alternatively or additionally, a lateral movement sensor 36, fed by network tap 28b, may monitor traffic that passes between network nodes, and/or may monitor activity of endpoint devices 32, in order to detect any possible advance of an attacker within the network. Similarly, a data center sensor 23, fed by network tap 28c, may monitor the flow of data to and from the data center, in order to detect unauthorized storage or retrieval of data.

Typically, system 20 further includes repositories of historical information. For example, a traffic repository 38 may store records of past network traffic, i.e., traffic that passed to, from, and/or within the network in the past. (Such information may be obtained via the network taps.) Alternatively or additionally, an endpoint-activity repository 40 may store records of past activity of endpoint devices. As further described below, such repositories provide historical information that may be used to facilitate the automatic investigation of incidents. Each repository may be implemented, for example, on a respective dedicated server.

In some embodiments, one or more of the repositories further function as sensors, i.e., the repositories may generate alerts upon the detection of suspicious activity. The repositories typically see a fuller picture of network activity than do the other sensors, and may thus complement the other sensors. For example, the traffic repository may determine whether a particular domain is suspicious, by analyzing the number of devices that have attempted to access the domain, and/or the frequency with which attempts to access the domain have been made. If, for example, a large number of devices have attempted to access the domain, it is unlikely that the domain is malicious, since this would imply that a large number of devices in the network are infected by the same malware. On the other hand, if only a small number of devices have attempted to access the domain, the traffic repository may determine that the domain is suspicious, and in response thereto, may generate an alert. The traffic repository thus complements the activity of command-and-control sensor 26, which sees the attempted accesses to the domain only one-by-one.

The same sort of statistical analysis may be performed by endpoint-activity repository 40, with respect to a particular file or process that is potentially malicious. For example, a particular file or process is more likely to be malicious if only a small number of devices on the network have accessed the file or run the process, relative to if a large number of devices have done so. (The above-described statistical analyses may also be performed as part of an incident investigation, as described below.)

Alternatively or additionally to the sensors and repositories described above, any other relevant type of network or endpoint sensor, or information repository, may be used. Moreover, the scope of the present disclosure includes providing any number of sensors and repositories of each type. Sensors and repositories may be implemented in hardware, software, or a combination of hardware and software elements.

System 20 further includes a unit that receives any alerts from the network sensors. Such a unit may be implemented, for example, on a server 46, comprising a network interface, such as a network interface card (NIC) 44, and a processor 42. Via NIC 44, processor 42 receives the alerts. The processor may then open incidents based on the alerts, and, as noted above, proactively investigate the incidents. For example, the processor may initiate the retrieval of appropriate information from the network, and/or issue instructions to a device and/or sensor on the network to perform a particular task, and communicate results of the task to the processor. In response to analyzing the retrieved information and/or results, the processor raises or lowers its level of confidence in the incident, until conclusion of the investigation.

The results of the investigation may then be presented to a user via a user interface 48, comprising, for example, a computer monitor and a keyboard. For example, if, based on the investigation, the processor ascertains that the security of the network has been compromised, the processor may generate an appropriate audio and/or visual output via user interface 48. In response to the output, the user may use interface 48 to conduct additional investigative work, and/or take appropriate action in response to the security threat. For example, the user may, via interface 48, issue instructions to the network perimeter to inhibit the exchange of communication between network 30 and the Internet.

Alternatively or additionally, at the conclusion of an investigation, the processor may generate an output that includes instructions communicated to network 30 via NIC 44. For example, in response to ascertaining that the security of the network has been compromised, the processor may instruct a particular endpoint device to disconnect itself from the rest of the network.

Alternatively or additionally, the results of the investigation may be securely shared with other parties, e.g., over the Internet. Similarly, processor 42 may use information from other parties to guide the investigation of an incident, and/or to issue appropriate instructions to the sensors. In this manner, organizations may collaborate with each other in fighting cyber threats.

Typically, computer network 30 comprises a single physical data bus that is shared by all of the devices and sensors in the network. Nonetheless, for clarity, FIG. 1 shows two separate data buses, since the channels of communication between the sensors and server 46 are logically distinct from the normal channels of communication between the interconnected devices of the network. Thus, for example, traffic repository 38 is shown connected to both the top and bottom "logical" buses; via the top logical bus, the traffic repository receives traffic that passes through the network, and via the bottom logical bus, the traffic repository communicates with server 46.

In general, processor 42 may be embodied as a single processor, or a cooperatively networked or clustered set of processors. Processor 42 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Incident Investigation

As noted above, typically, the processor investigates an incident by querying one or more sensors and/or repositories for information, and/or by communicating instructions to a particular device, sensor, or repository to perform a particular task and communicate the results of the task to the processor.

For example, command-and-control sensor 26 may generate an alert that indicates that a particular endpoint device accessed a suspicious domain, and further provides relevant details, such as the time at which, and the port from which, the domain was accessed. In response to the alert (alone, or in combination with other alerts), the processor may open an incident. The processor may then investigate the incident by first querying endpoint-activity repository 40 for the identity of the process that accessed the suspicious domain. The processor may then query the endpoint forensic sensor for details about the process, such as the executable file that ran the process. If the executable file belongs to the Windows™ system library and has a Microsoft™ certificate, the processor may ascertain that the incident is a false positive, or at least lower its level of confidence in the incident. Otherwise, the processor may instruct file analysis sensor 34 to scan the executable file, and use the results of the scan to help further the investigation.

As another example, the processor, upon opening an incident based on an alert from the endpoint forensic sensor regarding a particular file or process, may query the endpoint forensic server for more details regarding the file or process.

As another example, to investigate an incident regarding a potentially infected endpoint device—opened, for example, in response to one or more alerts from the lateral movement sensor and/or file analysis sensor—the processor may instruct the endpoint forensic sensor to scan the potentially infected endpoint device, and communicate the results of the scan to the processor.

As yet another example, to investigate an incident regarding a possibly malicious file, the processor may instruct the file analysis sensor to thoroughly scan the file. Alternatively or additionally, the processor may retrieve the file from the network, and subsequently thoroughly scan the file.

As yet another example, the processor may investigate an incident by instructing the traffic repository or endpoint repository to perform an analysis on historical data, such as the statistical analyses described above. Alternatively or additionally, the processor may itself perform such an analysis on the "raw data" retrieved from the relevant repository. That is, the processor may investigate the incident by (i) analyzing past traffic over the network, e.g., by retrieving at least one record of past network traffic from traffic repository 38, and/or (ii) analyzing past activity of at least one endpoint device on the network, e.g., by retrieving at least one record of past activity of at least one endpoint device on the network from endpoint-activity repository 40.

For example, the processor may open an incident, based on an alert from the command-and-control sensor that indicates that a particular endpoint device accessed a suspicious domain. To investigate the incident, the processor may query the traffic repository for a list of endpoints that accessed the domain in the past, e.g., over the last month. If a relatively large number of endpoints accessed the domain, the processor may ascertain that the incident is a false positive, or at least lower its level of confidence in the incident. Otherwise, the processor may raise its level of confidence in the incident, and/or may further investigate one or more of the devices that accessed the domain. Alternatively or additionally, the processor may query the endpoint-activity repository for the identity of the process that accessed the suspicious domain, and analyze the process.

In some cases, to investigate an incident, the processor retrieves, and analyzes, previously-received alerts, alternatively or additionally to performing the other investigative techniques described herein.

In some embodiments, in response to a received alert, the processor raises the sensitivity level of at least one of the sensors. For example, upon receiving an alert from a sensor that an attacker has possibly penetrated the network, the processor may raise the sensitivity level of the lateral movement sensor, whose primary function is to detect the advance of an attacker within the network. Subsequently, based on alerts and/or other information received from the lateral movement sensor, the processor may more effectively determine whether to open an incident, and/or may more effectively investigate the incident, relative to if the sensitivity level of the lateral movement sensor had not been raised.

In some embodiments, at the conclusion of an investigation, in response to ascertaining whether the security of the network has been compromised, the processor modifies the criteria for alert generation of one or more of the sensors. For example, the processor may investigate an incident that is based on an alert from a lateral movement sensor regarding suspicious communication between two endpoint devices. At the conclusion of the investigation, the processor may ascertain that the incident is a false positive, in that the endpoint that initiated the communication belongs to the network administrator, and hence, the communication was legitimate. In response thereto, the processor may instruct the lateral movement sensor not to generate any more alerts regarding such communication if such communication shows evidence of having been initiated by the network administrator, even if such communication otherwise appears to be suspicious.

Figure 2:
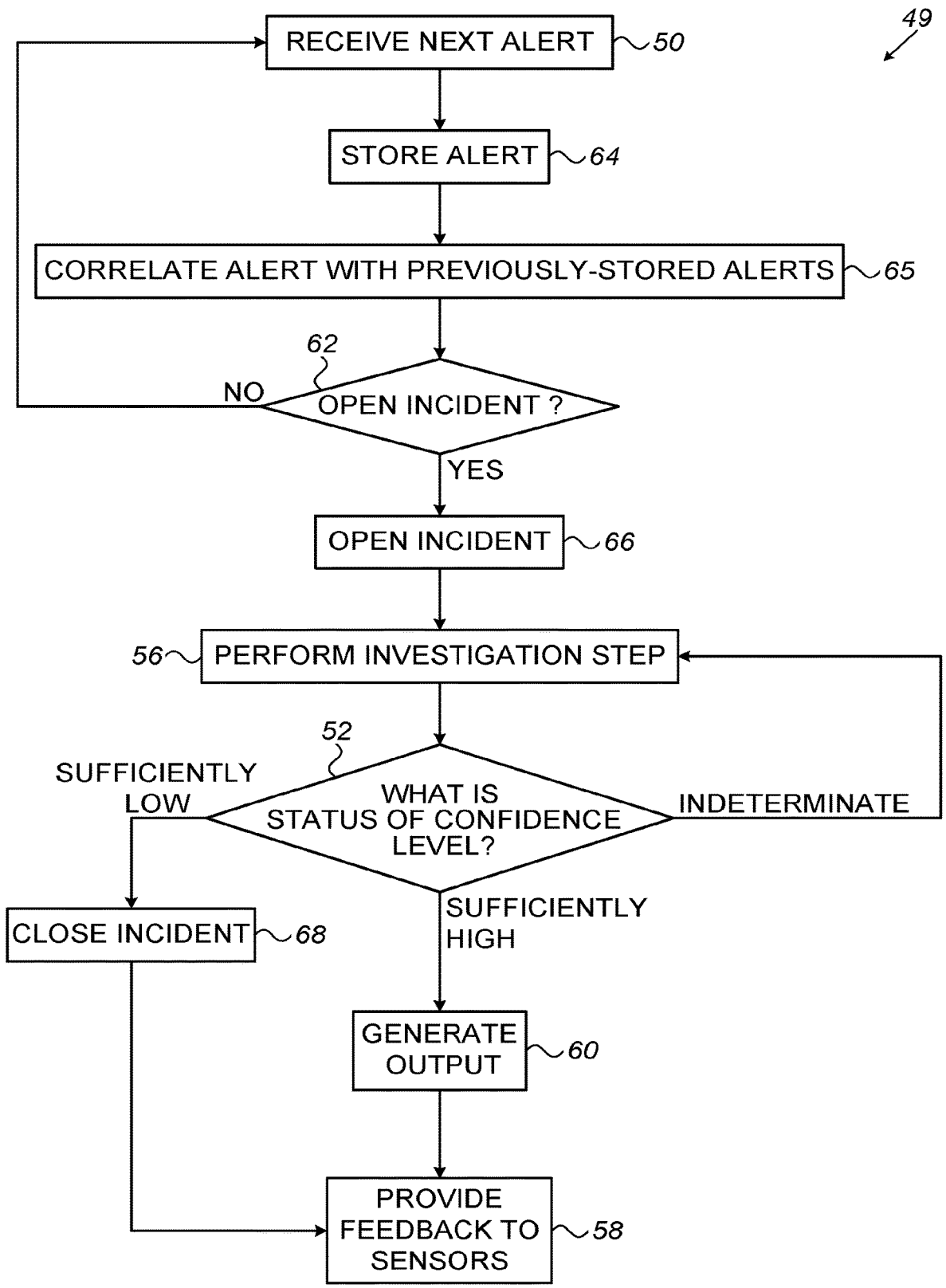
FIG. 2 is a flow diagram for a method for monitoring security of a computer network, in accordance with some embodiments described herein.

Reference is now made to FIG. 2, which is a flow diagram for a method 49 for monitoring security of computer network 30, which is performed by processor 42, in accordance with some embodiments described herein.

Method 49 begins with an alert-receiving step 50, at which the processor receives an alert from a particular sensor. The processor first stores the alert (e.g., in a digital memory on server 46, and/or in a database external to server 46), at an alert-storing step 64. Next, at a correlating step 65, the processor correlates the newly-received alert with previously-stored alerts. Based on the correlation, the processor decides, at a decision step 62, whether to open an incident. In particular, if the newly-stored alert, in light of one or more of the previously-stored alerts, indicates a possible compromise to the security of the network, the processor decides to open an incident. (In some cases, the newly-received alert may be sufficiently indicative of a security compromise, such that the processor opens an incident even without first correlating the newly-received alert to previously-stored alerts.)

Further to opening an incident at an incident-opening step 66, the processor begins to investigate the incident. An investigation typically compromises multiple steps, executed in sequence by the processor until the level of confidence in the incident is sufficiently high (e.g., greater than a first, higher threshold) or low (e.g., less than a second, lower threshold). Each step of the investigation, performed at an investigation-step-performing step 56, may comprise any of the investigative techniques described above, and/or any other relevant investigative techniques.

Following each investigation step, the processor assesses the confidence level in the incident, at a confidence-level-assessing step 52. If the confidence level is sufficiently high, the processor ascertains that the security of the network has been compromised (i.e., that the incident is a true positive), and hence, generates an output, at an output-generating step 60, that informs a user of the situation and/or takes remedial action, as described above. Otherwise, the processor ascertains that the security of the network has not been compromised (i.e., that the incident is a false positive), and closes the incident, at an incident-closing step 68.

As described above, based on the result of the investigation, the processor may provide feedback to the sensors, at a feedback-providing step 58. In particular, the processor may modify the alert-generation criteria of one or more of the sensors that contributed to the incident, either by providing "negative feedback" that reduces the rate of occurrence of false positives, or by providing "positive feedback" that increases the rate of occurrence of true positives.

If all automatic investigation options have been exhausted, and the level of confidence in the incident is still indeterminate, the incident may be passed to network security personnel for manual investigation.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for monitoring security of a computer network, the system comprising:
    a network interface connected to a perimeter of the computer network to a server computer and at least one other entity on the network;
    a traffic repository, configured to store historical data of network communications that passed to, from, and/or within the network, the traffic repository including at least one traffic repository sensor;
    a plurality of sensors associated with the computer network comprising the at least one traffic repository sensor of the traffic repository as one of the plurality of sensors;
    a processor, connected to a memory storing computer implemented instructions on the server computer, and when instructed by the computer implemented instructions that is configured to:
        a) receive, from one or more of a plurality of sensors, one or more alerts indicative of a possible compromise to the security of the computer network;
        b) automatically investigate the alerts, by (i) communicating instructions to at least one entity on the computer network, and (ii) analyzing information received in response to the instructions to produce investigated alerts, wherein the information includes at least one record of the historical data of network traffic to produce a level of confidence in the computer alerts; and
        c) generate an output, in response to the level of confidence in the computer alerts.

2. The system according to claim 1, wherein the processor is configured to, compute a level of confidence in the alerts, and to generate the output only if the level of confidence exceeds a given threshold.

3. The apparatus according to claim 1, wherein the at least one entity includes one of the plurality of sensors and the instructions include instructions to an endpoint forensic sensor to scan an endpoint device on the computer network.

4. The apparatus according to claim 3, wherein the instructions include instructions to a file analysis sensor to scan a file.

5. The apparatus according to claim 3, wherein the at least one entity includes one of the plurality of sensors that did not generate any of the received alerts.

6. The apparatus according to claim 1, wherein the information includes at historical data of at least one endpoint device on the computer network.

7. The apparatus according to claim 1, wherein the processor is further configured to, in response to investigating the alerts, modify criteria for alert generation of at least one of the plurality of sensors.

8. A system for monitoring security of a computer network, the system comprising:
    a network interface connected to a perimeter of the computer network to a server computer and at least one other entity on the network;
    a traffic repository configured to store historical data of network traffic that passed to, from, and/or within the network;
    a plurality of sensors associated with the computer network comprising at least one traffic repository sensor as one of the plurality of sensors;
    a processor, connected to a memory storing computer implemented instructions on the server computer, and when instructed by the computer implemented instructions configured to:
        a) receive, from one or more of a plurality of sensors, one or more alerts indicative of a possible compromise to the security of the computer network;
        b) automatically investigate the alerts, by (i) communicating instructions to at least one entity on the computer network, and (ii) analyzing information received in response to the instructions to produce investigated alerts;
        c) analyze, at least one record of the historical data of network traffic and the investigated alerts to produce a level of confidence in the computer alerts; and
        d) generate an output, in response to the level of confidence in the computer alerts.

9. A method for monitoring security of a computer network, the method comprising:
    connecting a network interface from a perimeter of the computer network to a server computer and at least one other entity on the network;
    connecting, to the computer network, a traffic repository, configured to store historical data of network communications that passed to, from, and/or within the network, the traffic repository including at least one traffic repository sensor;
    connecting, to a computer network, a plurality of sensors associated with the computer network comprising the at least one traffic repository sensor of the traffic repository as one of the plurality of sensors;
    receiving, from one or more of a plurality of sensors associated with the computer network, one or more alerts indicative of a possible compromise to the security of the computer network;
    investigating, automatically the alerts, by (i) communicating instructions to at least one entity on the computer network, and (ii) analyzing information received in response to the instructions, wherein the information includes at least one record of the historical data of network traffic to produce a level of confidence in the computer alerts; and
    generating an output, in response to the level of confidence in the computer.

10. The method according to claim 9, wherein investigating the alerts comprises computing a level of confidence in the alerts, and wherein generating the output comprises generating the output in response to the level of confidence exceeding a given threshold.

11. The method according to claim 10, wherein the instructions include instructions to an endpoint forensic sensor to scan an endpoint device on the computer network.

12. The method according to claim 10, wherein the instructions include instructions to a file analysis sensor to scan a file.

13. The method according to claim 10, wherein the at least one entity includes one of the plurality of sensors that did not generate any of the received alerts.

14. The method according to claim 9, wherein the at least one entity includes one of the plurality of sensors.

15. The method according to claim 9, wherein the information includes historical data of at least one endpoint device on the computer network.

16. The method according to claim 9, further comprising, in response to investigating the alerts, modify criteria for alert generation of at least one of the plurality of sensors.

17. A method for monitoring security of a computer network, the method comprising:
- connecting a network interface from a perimeter of the computer network to a server computer and at least one other entity on the network;
- connecting, to the computer network, a traffic repository, configured to store historical data of network communications that passed to, from, and/or within the network, the traffic repository including at least one traffic repository sensor;
- connecting, to a computer network, a plurality of sensors associated with the computer network comprising the at least one traffic repository sensor of the traffic repository as one of the plurality of sensors;
- receiving, from one or more of a plurality of sensors associated with the computer network, one or more alerts indicative of a possible compromise to the security of the computer network;
- investigating, automatically the alerts, by (i) communicating instructions to at least one entity on the computer network, and (ii) analyzing information received in response to the instructions;
- analyzing, at least one record of the historical data of network traffic and the investigated alerts to produce a level of confidence in the computer alerts; and
- generating an output, in response to the level of confidence in the computer.

18. A computer software product comprising a tangible non-transitory computer-readable medium in which program instructions are stored, which instructions, when read by a processor, cause the processor to:
- receive, from one or more of a plurality of sensors associated with a computer network, one or more alerts indicative of a possible compromise to the security of the computer network;
- investigate, automatically the alerts, by communicating instructions to at least one entity on the computer network, and (ii) analyzing information received in response to the instructions, wherein the information includes at least one record of historical data of network traffic provided by at least one traffic repository sensor of a traffic repository, the traffic repository configured to store historical data of network communications that passed to, from, and/or within the computer network to produce a level of confidence in the computer alerts; and
- generate an output, in response to the level of confidence in the computer.

* * * * *